(12) United States Patent
Kuwahara (10) Patent No.: US 9,391,460 B2
(45) Date of Patent: Jul. 12, 2016

(54) POWER CONTROL APPARATUS AND POWER CONTROL METHOD

(75) Inventor: Hitoshi Kuwahara, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 409 days.

(21) Appl. No.: 14/119,380

(22) PCT Filed: May 24, 2012

(86) PCT No.: PCT/JP2012/063331
§ 371 (c)(1),
(2), (4) Date: Nov. 21, 2013

(87) PCT Pub. No.: WO2012/161255
PCT Pub. Date: Nov. 29, 2012

(65) Prior Publication Data
US 2014/0097695 A1    Apr. 10, 2014

(30) Foreign Application Priority Data

May 24, 2011    (JP) .................................. 2011-116279

(51) Int. Cl.
*H01H 47/00*    (2006.01)
*H01H 35/00*    (2006.01)
(Continued)

(52) U.S. Cl.
CPC .  *H02J 5/00* (2013.01); *H02J 3/383* (2013.01); *H02J 9/06* (2013.01); *H02J 2003/388* (2013.01);
(Continued)

(58) Field of Classification Search
CPC ....... H02J 5/00; H02J 3/383; H02J 2003/388; Y10T 307/702; Y10T 307/826

USPC ..................................................... 307/81, 126
See application file for complete search history.

(56) References Cited

U.S. PATENT DOCUMENTS

2011/0291479 A1*   12/2011   Lee ........................... H02J 3/32
307/43

FOREIGN PATENT DOCUMENTS

JP    09-149554 A    6/1997
JP    10-028330 A    1/1998
(Continued)

OTHER PUBLICATIONS

International Search Report; PCT/JP2012/063331; Jul. 31, 2012.

*Primary Examiner* — Carlos Amaya
(74) *Attorney, Agent, or Firm* — Procopio, Cory, Hargreaves & Savitch LLP (57) ABSTRACT

A power control device is provided at a customer site having a distributed power supply capable of supplying power and load devices and controls a stand-alone operation in which the power supplied from the distributed power supply is converted to AC power and supplied to the load devices. The power control device comprises: a determination processing unit for determining whether or not a power supply supplied from the distributed power supply during the stand-alone operation satisfies a power demand necessary for operating the load devices; and a supply control unit for, when it is determined that the power supply does not satisfy the power demand, intermitting the stand-alone operation. After intermitting the stand-alone operation, the determination processing unit re-executes the stand-alone operation and determines whether the power supply satisfies the power demand or not. When it is consecutively determined predetermined times that the power supply does not satisfy the power demand or when a predetermined period of time has elapsed without determining that the power supply satisfies the power demand after determining that the power supply does not satisfy the power demand, the determination processing unit stops the re-execution.

11 Claims, 5 Drawing Sheets

(51) Int. Cl.
| | |
|---|---|
| *H01H 83/18* | (2006.01) |
| *H02H 3/02* | (2006.01) |
| *H02H 3/42* | (2006.01) |
| *H02J 5/00* | (2016.01) |
| *H02J 9/06* | (2006.01) |
| *H02J 3/38* | (2006.01) |

(52) U.S. Cl.
CPC ................. *Y02B 10/72* (2013.01); *Y02E 10/563* (2013.01); *Y02E 10/566* (2013.01); *Y10T 307/702* (2015.04); *Y10T 307/826* (2015.04)

(56) References Cited

FOREIGN PATENT DOCUMENTS

| | | |
|---|---|---|
| JP | 10-336916 A | 12/1998 |
| JP | 2003-319561 A | 11/2003 |

* cited by examiner

POWER CONTROL APPARATUS AND POWER CONTROL METHOD

TECHNICAL FIELD

The present invention relates to a power control apparatus and a power control method. The power control apparatus is provided at a consumer site having a distributed power supply and a load equipment, and controls a stand-alone operation in which power supplied from the distributed power is converted into AC power and the converted AC power is supplied to the load equipment.

BACKGROUND ART

In recent years, power control apparatuses for converting power supplied from distributed power supply, e.g., photovoltaic cells, wind power generators, etc., into AC power is becoming pervasive at power consumer sites, e.g., ordinary homes. Such power control apparatuses can also execute a stand-alone operation for supplying power supplied from distributed power supply to load equipments at consumer sites, for example, when the power system breaks down (for example, refer to Patent Literature 1).

Here, the power output from distributed power supply, e.g., photovoltaic cells, depends on the weather. Accordingly, the power supplied to a load equipment from distributed power supply (hereinafter referred to as supplied power) at the time of a stand-alone operation may not satisfy power required for operating the load equipment (hereinafter referred to as demanded power). In such a case, a sufficient quantity of power cannot be supplied to the load equipment, and therefore a correct operation of the load equipment is not ensured.

Accordingly, when a stand-alone operation is started to connect the distributed power supply and the load equipment, such a power control apparatus executes an output determination process for determining whether or not a supplied power from distributed power supply satisfies a demanded power required for operating the load equipment.

CITATION LIST

Patent Literature

[Patent literature 1] Japanese Unexamined Patent Application Publication No. H10-336916

SUMMARY OF INVENTION

A first feature is summarized as a power control apparatus, provided at a consumer site having a distributed power supply capable of supplying power and a load equipment, controlling a stand-alone operation in which power supplied from the distributed power supply is converted into AC power and the converted AC power is supplied to the load equipment, the power control apparatus comprising: a determination processing unit that determines whether or not a supplied power from the distributed power supply satisfies a demanded power required for operating the load equipment, when it operates in the stand-alone operation; and a supply control unit that suspends the stand-alone operation if it is determined that the supplied power does not satisfy the demanded power, wherein the determination processing unit re-executes the stand-alone operation after suspending the stand-alone operation, and determines whether or not the supplied power satisfies the demanded power, and stops the re-executing of the stand-alone operation if it is determined continuously for a predetermined number of times that the supplied power does not satisfy the demanded power, or if a predetermined period elapses without determining that the supplied power satisfies the demanded power after determining that the supplied power does not satisfy the demanded power.

In the first feature, the determination processing unit executes the re-executing process and the determining process at predetermined intervals, after suspending the stand-alone operation.

In the first feature, the determination processing unit starts supplying an output from the distributed power supply to the load equipment after the re-executing process, and executes the determining process after starting to supply the power.

In the first feature, the determination processing unit starts power supply from the distributed power supply to the load equipment, after a first time period elapses from the re-executing process.

In the first feature, the determination processing unit executes the determining process after a second time period elapses from a start of the power supply from the distributed power supply to the load equipment is started.

In the first feature, the determination processing unit does not stop the re-executing process if the load equipment is not a specific device, even if it is determined continuously for the predetermined number of times that the supplied power does not satisfy the demanded power, or even if the predetermined period elapses after determining that the supplied power does not satisfy the demanded power without determining that the supplied power satisfies the demanded power.

In the first feature, the power control apparatus according to claim 6, comprises: an interface that communicates with a power management device that manages power of the load equipment, and that obtains type information on whether or not the load equipment is the specific device.

In the first feature, the specific device is a space heater or a voice output device.

In the first feature, the power control apparatus comprises: an interface that communicates with a power management device that manages power of the load equipment. The determination processing unit instructs the power management device to stop the operation via the interface when the load equipment corresponding to a specific device exists, if it is determined continuously for a predetermined number of times that the supplied power does not satisfy the demanded power, or if a predetermined period elapses after determining that the supplied power does not satisfy the demanded power without determining that the supplied power satisfies the demanded power.

In the first feature, the specific device is a space heater or a voice output device.

A second feature is summarized as a power control method in a power control apparatus provided at a consumer site having a distributed power supply capable of supplying power and a load equipment, the power control apparatus that controls a stand-alone operation in which power supplied from the distributed power supply is converted into AC power and the converted AC power is supplied to the load equipment, the power control method comprising: a step of determining whether or not a supplied power from the distributed power supply satisfies a demanded power required for operating a load equipment, at the time of the stand-alone operation; a step of suspending the stand-alone operation if it is determined that the supplied power not satisfying the demanded power; a step of re-executing the stand-alone operation after suspending the stand-alone operation, and determining whether or not the supplied power satisfies the demanded power; and a step of stopping the re-executing of the stand-alone operation if it is determined continuously for a predetermined number of times that the supplied power does not satisfy the demanded power, or if a predetermined period elapses without determining that the supplied power satisfies the demanded power after determining that the supplied power does not satisfy the demanded power.

DESCRIPTION OF EMBODIMENTS

First Embodiment

Next, a first embodiment of the present invention will be described with reference to drawings. Specifically, there will be described (1) a configuration of a power control system, (2) a configuration of a power conditioner, and (3) an operation of the power conditioner. Note that, in the description of drawings in the following embodiments, the identical or similar reference numeral is attached to the identical or similar part.

(1) Configuration of Power Control System

Figure 1:
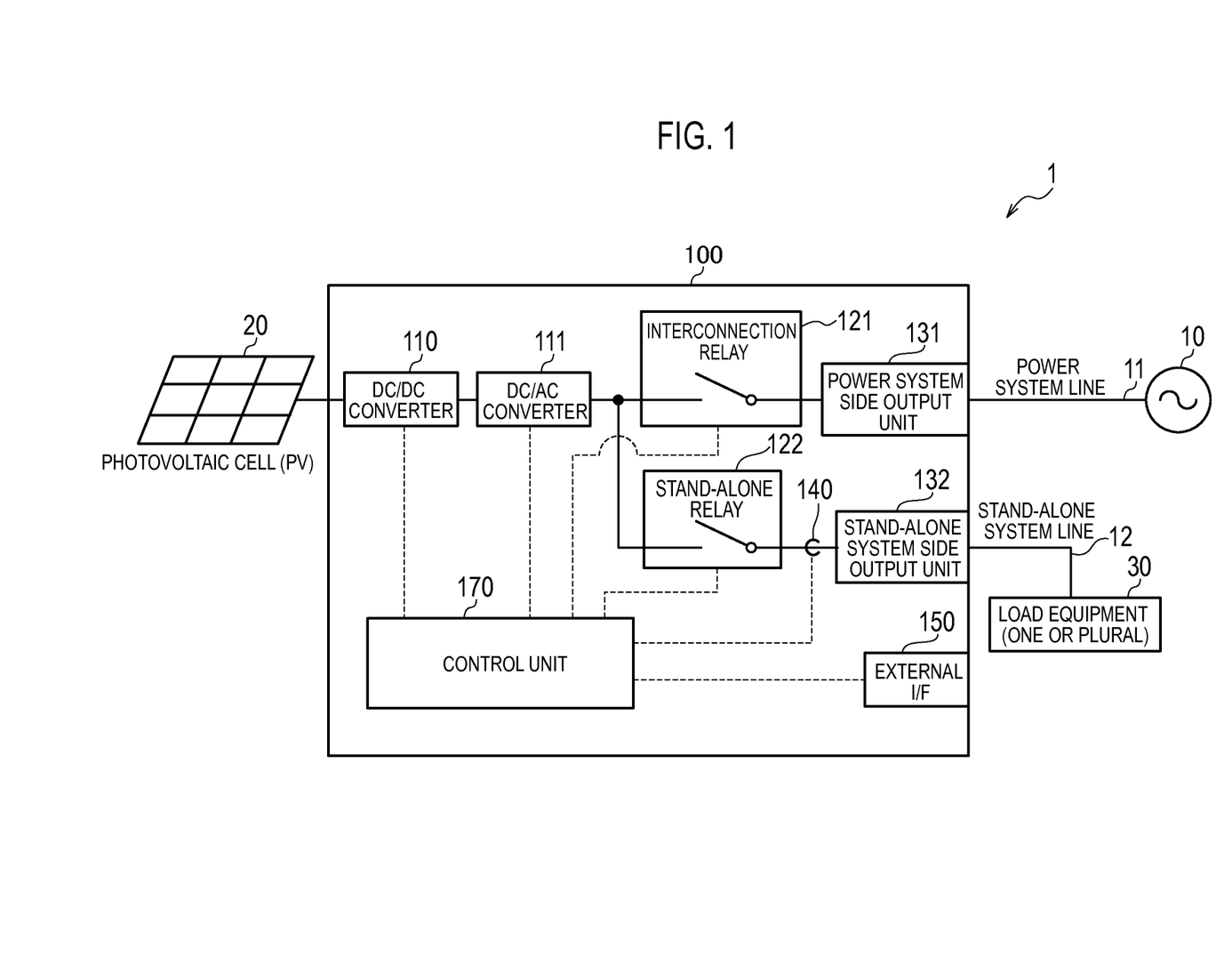
FIG. 1 is a schematic structure diagram showing a configuration of a power control system according to a first embodiment of the present invention.

FIG. 1 is a schematic structure diagram of the power control system 1 according to the present embodiment. Such a power control system 1 is provided at consumer sites, e.g., ordinary homes, and can execute power control of load equipments at the consumer site. Note that, in the following drawings, a solid line indicates a power line, and a dashed line indicates a control signal line.

As shown in FIG. 1, the power control system 1 includes a photovoltaic cell 20 for generating direct current (DC) power, a load equipment 30 connected to stand-alone system line 12, and a power conditioner 100. Although the power control system 1 also includes a load equipment etc., connected to a cabinet panel or power system line 11 in addition to the above-mentioned components, descriptions thereof are omitted in the present embodiment.

Note that the power system line 11 is a distribution line connected between a power system 10 and a power system side output unit 131 of the power conditioner 100 (described later). Moreover, the stand-alone system line 12 is a distribution line connected to a stand-alone system side output unit 132 of the power conditioner 100 (described later).

A photovoltaic cell 20 can receive sunlight, and generate DC power in accordance with the received sunlight. The photovoltaic cell 20 outputs the generated DC power to the power conditioner 100. In the present embodiment, the photovoltaic cell 20 configures distributed power supply capable of supplying power into a consumer site. Note that the power control system 1 may further include a storage battery as distributed power supply.

The load equipments 30 envisioned include home electronics provided at the consumer site, e.g., electric heaters, televisions, lighting devices, and air-conditioners. The load equipment 30 is connected to the stand-alone system line 12. In the power control system 1, the cabinet panel etc., can switch so that the load equipment 30 may connect to any one of the power system line 11 and the stand-alone system line 12. The cabinet panel etc., may connect the load equipment 30 to the stand-alone system line 12 only at the time of the stand-alone operation.

The power conditioner 100 is connected to the photovoltaic cell 20, the power system line 11, and the stand-alone system line 12. Moreover, the power conditioner 100 can switch between an interconnection operation for outputting power supplied from the photovoltaic cell 20 to the power system line 11, and a stand-alone operation for outputting the power supplied from the photovoltaic cell 20 to the stand-alone system line 12.

Specifically, at the time of the interconnection operation, the power conditioner 100 converts DC power generated by the photovoltaic cell 20 into AC power, and outputs the AC power to the power system line 11. The AC power output to the power system line 11 is suitably used in the load equipment, or becomes power reverse-flowed to the power system 10.

On the other hand, at the time of the stand-alone operation, the power conditioner 100 converts DC power generated by the photovoltaic cell 20 into AC power, and outputs the AC power to the stand-alone system line 12. The AC power output to the stand-alone system line 12 is suitably used in the load equipment 30. That is, the AC power output to the stand-alone system line 12 is consumed by the load equipment 30 provided at the consumer site. Note that details of a configuration of the power conditioner 100 will be described later. In the present embodiment, the power conditioner 100 configures a power control apparatus.

(2) Configuration of Power Conditioner

Next, a configuration of the power conditioner 100 will be specifically described. The power conditioner 100 includes a DC/DC converter 110, a DC/AC converter 111, an interconnection relay 121, a stand-alone relay 122, a power system side output unit 131, a stand-alone system side output unit 132, a measuring unit 140, an external I/F 150, and a control unit 170. Note that the power conditioner 100 includes a display unit that displays information including an operation condition for users, and an input unit that accepts instructions from the users, etc., but descriptions thereof are omitted herein.

The DC/DC converter 110 inputs DC power output from the photovoltaic cell 20, and executes DC/DC conversion (boosting conversion) of the DC power and outputs the converted power to the DC/AC converter 111.

The DC/AC converter 111 converts the DC power output from the DC/DC converter 110 to AC power, and outputs the AC power to the interconnection relay 121 and the stand-alone relay 122. At this time, the DC/AC converter 111 outputs the AC power while executing a constant voltage output control for stabilizing the AC power at predetermined voltage (for example, AC100V).

The interconnection relay 121 is provided between the DC/AC converter 111 and the power system side output unit 131. The interconnection relay 121 connects or disconnects between the DC/AC converter 111 and the power system side output unit 131 by switching a closing operation or an opening operation.

At the time of the interconnection operation for supplying power from the photovoltaic cell 20 to the power system line 11, the interconnection relay 121 connects (interconnects) between the DC/AC converter 111 and the power system side output unit 131, and outputs the power to the power system side output unit 131. On the other hand, at the time of the stand-alone operation for supplying power from the photovoltaic cell 20 to the stand-alone system line 12, the interconnection relay 121 disconnects (parallels off) between the DC/AC converter 111 and the power system side output unit 131, and stops the output of power to the power system side output unit 131. Note that the interconnection relay 121 executes connection or disconnection in response to instructions from the control unit 170.

The stand-alone relay 122 is provided between the DC/AC converter 111 and the stand-alone system side output unit 132. The stand-alone relay 122 connects or disconnects between the DC/AC converter 111 and the stand-alone system side output unit 132 by switching a closing operation or an opening operation.

At the time of the interconnection operation for supplying power from the photovoltaic cell 20 to the power system line 11, the stand-alone relay 122 disconnects between the DC/AC converter 111 and the stand-alone system side output unit 132, and stops the output of power to the stand-alone system side output unit 132. On the other hand, at the time of the stand-alone operation for supplying power from the photovoltaic cell 20 to the stand-alone system line 12, the stand-alone relay 122 connects between the DC/AC converter 111 and the stand-alone system side output unit 132, and outputs power to the stand-alone system side output unit 132. Note that the stand-alone relay 122 executes connection or disconnection in response to instructions from the control unit 170.

The power system side output unit 131 outputs the power output from the DC/AC converter 111 to the power system line 11 via the interconnection relay 121. Note that the power system side output unit 131 outputs power to the power system line 11 only at the time of the interconnection operation.

The stand-alone system side output unit 132 outputs the power output from the DC/AC converter 111 to the stand-alone system line 12 via the stand-alone relay 122. Note that the stand-alone system side output unit 132 outputs power to the stand-alone system line 12 only at the time of the stand-alone operation. The power output to the stand-alone system line 12 is suitably supplied to the load equipment 30. Moreover, the power system side output unit 131 and the stand-alone system side output unit 132 may output power through a single phase three wire system, and may output power through a single phase two wire system.

The measuring unit 140 measures power supplied to the load equipment 30 at the time of the stand-alone operation. Specifically, the measuring unit 140 is provided on a power line between the stand-alone relay 122 and the stand-alone system side output unit 132. The measuring unit 140 measures a voltage and current supplied from the stand-alone relay 122 to the stand-alone system side output unit 132 at the time of the stand-alone operation.

In other words, the measuring unit 140 measures the power supplied to the load equipment 30 via the stand-alone system side output unit 132 and the stand-alone system line 12 at the time of the stand-alone operation. Moreover, the measuring unit 140 notifies a measured result to the control unit 170. Note that the measuring unit 140 may be provided at the front of the stand-alone relay 122, i.e., between the DC/AC converter 111 and the stand-alone relays 122, or may be provided in the stand-alone system side output unit 132. Note that although the present embodiment describes the case where the voltage and the current are measured by one measuring unit 140, one measuring unit 140 may measure the voltage and another measuring unit provided in another place may measure the current, for example.

The external I/F 150 is connected to the control unit 170 via a control signal line. The external I/F 150 can communicate via a home communication line with another devices, e.g., a load equipment 30 provided at the consumer site. Moreover, the external I/F 150 can also notify an operation condition of executing either the interconnection operation or the stand-alone operation over wide area networks, e.g., the Internet, to an energy management system for controlling power consumed at a consumer site group including the consumer site. Moreover, the external I/F 150 can also accept instructions input by a user's predetermined operation of the load equipment, and can output the instructions to the control unit 170.

The control unit 170 communicates with each function unit in the power conditioner 100 via the control signal line. When the control unit 170 executes the interconnection operation or the stand-alone operation, the control unit 170 controls each function unit in the power conditioner 100 in response to each operation condition. For example, when executing the interconnection operation, the control unit 170 instructs to the interconnection relay 121 so as to connect between the DC/AC converter 111 and the power system side output unit 131, and instructs to the stand-alone relay 122 so as to disconnect between the DC/AC converter 111 and the stand-alone system side output unit 132.

Moreover, when executing the stand-alone operation, the control unit 170 instructs to the interconnection relay 121 so as to disconnect between the DC/AC converter 111 and the power system side output unit 131, and instructs to the stand-alone relay 122 so as to connect between the DC/AC converter 111 and the stand-alone system side output unit 132.

Figure 2:
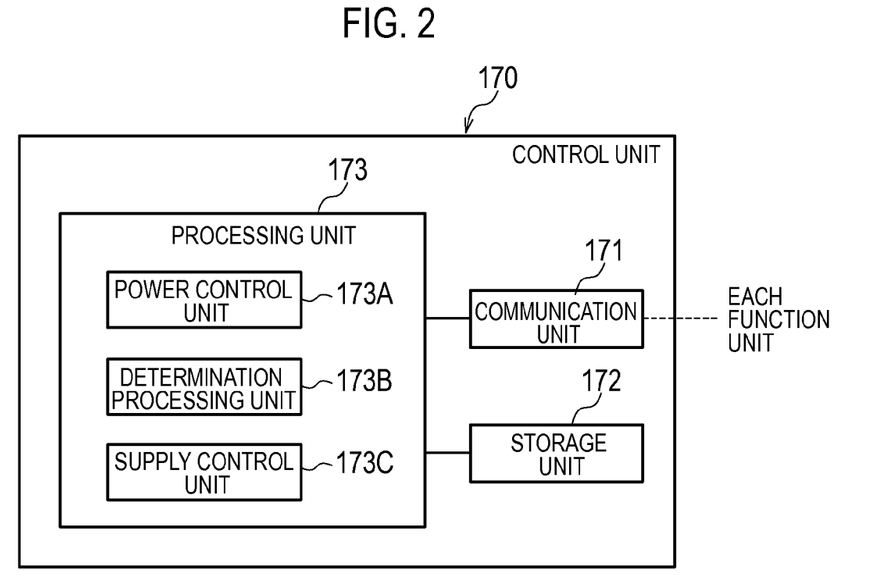
FIG. 2 is a diagram showing a configuration of a control unit in a power conditioner according to the first embodiment of the present invention.

Next, a configuration of the control unit 170 in the power conditioner 100 according to the present embodiment will be specifically described with reference to FIG. 2. As shown in FIG. 2, the control unit 170 includes a communication unit 171, a storage unit 172, and a process unit 173.

The communication unit 171 communicates with each function unit in the power conditioner 100 via the control signal line. The communication unit 171 can also communicate with other devices, e.g., the load equipment, via the external I/F 150. The storage unit 172 stores programs executed by the process unit 173, and is used also as a working memory during the execution of the program in the process unit 173.

The process unit 173 controls each function in the control unit 170. A process unit 173 includes a power controller 173A, a determination processing unit 173B, and a supply control unit 173C.

The power controller 173A controls an operational status of the power conditioner 100. For example, when the power controller 173A receives an instruction to execute the interconnection operation or the stand-alone operation from the external I/F 150 via the communication unit 171, the power controller 173A notifies to the determination processing unit 173B and the supply control unit 173C so as to switch to the interconnection operation or the stand-alone operation in response to the instruction. Note that the instructions to execute the interconnection operation or the stand-alone operation is may be input by the user from the external I/F 150 so that the user may switch manually and directly therebetween.

The determination processing unit 173B executes an output determination process for determining whether or not the power supplied from the photovoltaic cell 20 satisfies power required for operating the load equipment at the time of the stand-alone operation. At this point, the present embodiment describes the power supplied from the photovoltaic cell 20 to the load equipment 30 as a supplied power. That is, the power output from the photovoltaic cell 20, and then supplied from the stand-alone system side output unit 132 to the load equipment 30 after being converted into AC is described as a supplied power. Moreover, power required for a normal operation of the load equipment 30 is described as a demanded power. Note that the demanded power may be power required for a normal operation of one load equipment 30, or may be a total value of power required for normal operations of a plurality of the load equipments 30.

Specifically, the determination processing unit 173B stores beforehand a voltage value (hereinafter, adjusted voltage value) adjusted by a constant voltage control executed by the DC/AC converter 111. Moreover, the determination processing unit 173B obtains a voltage value (hereinafter, measured voltage value) measured by the measuring unit 140 when the stand-alone operation is started. The determination processing unit 173B determines whether or not the measured voltage value is smaller than the adjusted voltage value.

Moreover, the determination processing unit 173B determines that the supplied power satisfies the demanded power if determining that the measured voltage value is not smaller than the adjusted voltage value. On the other hand, the determination processing unit 173B determines that the supplied power does not satisfy the demanded power if determining that the measured voltage value is smaller than the adjusted voltage value. Moreover, the determination processing unit 173B notifies the determined result to the supply control unit 173C.

The supply control unit 173C continues the stand-alone operation if it is determined that the supplied power satisfies the demanded power, but suspends the stand-alone operation if it is determined that the supplied power does not satisfy the demanded power.

Specifically, if the supply control unit 173C receives a notice that the supplied power satisfies the demanded power from the determination processing unit 173B as a determined result, the supply control unit 173C performs particularly no operation, but continues the stand-alone operation. On the other hand, the supply control unit 173C instructs to the stand-alone relay 122 so as to disconnect therebetween, if a notice that the supplied power does not satisfy the demanded power is received from the determination processing unit 173B as a determined result. That is, the supply control unit 173C suspends the stand-alone operation.

Subsequently, the supply control unit 173C increments by 1 a count number indicating the number of times of the determination that the supplied power does not satisfy the demanded power. In this case, the count number indicates the number of times of continuously determining that the supplied power does not satisfy the demanded power.

Moreover, the supply control unit 173C determines whether or not the incremented count number is equal to or greater than a predetermined threshold value (predetermined number of times). If the supply control unit 173C determines that the count number is smaller than the threshold value, the supply control unit 173C notifies the determined result to the determination processing unit 173B. The determination processing unit 173B which received this notice repeats the output determination process at predetermined intervals. That is, after suspending the stand-alone operation, the determination processing unit 173B re-executes the stand-alone operation at predetermined intervals, and then determines whether or not the supplied power satisfies the demanded power. However, the output determination process may be executed at random.

On the other hand, if the supply control unit 173C determines that the incremented count number is equal to or greater than the threshold value, the supply control unit 173C notifies the determined result to the determination processing unit 173B. The determination processing unit 173B which received this notice stops re-execution of the stand-alone operation. That is, the determination processing unit 173B also stops the output determination process. In this manner, the determination processing unit 173B stops re-execution of the stand-alone operation, if the number of times of continuously determining that the supplied power does not satisfy the demanded power reaches the predetermined number of times. Note that the determination processing unit 173B can set up and input beforehand the aforementioned predetermined number of times, on the basis of a user's input.

(3) Operation of Power Conditioner

Figure 3:
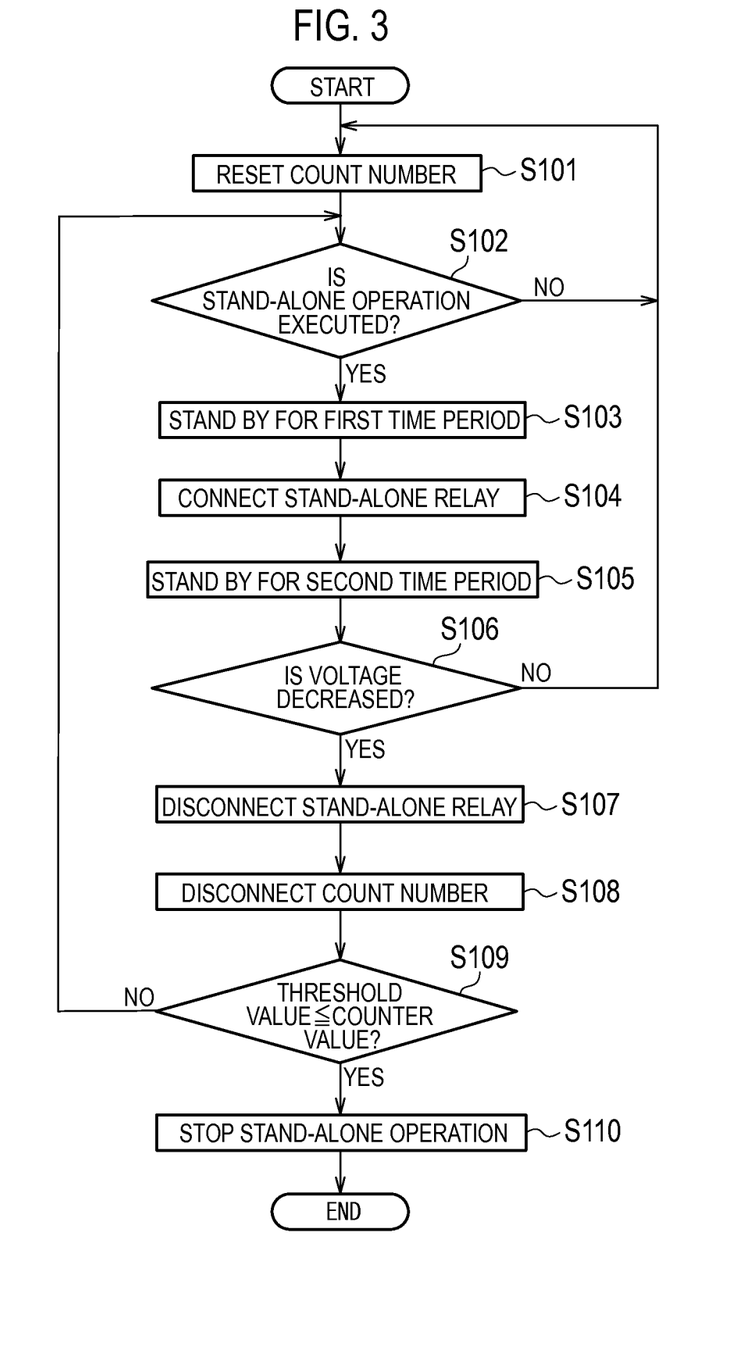
FIG. 3 is a sequence diagram showing an operation of the power conditioner according to the first embodiment of the present invention.

Next, an operation of the power conditioner 100 will be described with reference to FIG. 3. Specifically, there will be described an operation at the time when the power conditioner 100 executes the stand-alone operation. FIG. 3 is a sequence diagram showing an operation executed by the power conditioner 100.

First, in step S101, the supply control unit 173C resets the count number for indicating the number of times of determining that the supplied power does not satisfy the demanded power before the stand-alone operation is started, in the power conditioner 100.

In step S102, the determination processing unit 173B contacts the power controller 173A to determine whether or not the stand-alone operation should be executed. For example, the determination processing unit 173B determines whether or not an instruction to execute the stand-alone operation is input by the user. Note that the determination processing unit 173B repeats the operation of steps S101 to S102 if it is determined to not execute the stand-alone operation.

In step S103, the determination processing unit 173B stands by for a first time period if it is determined to execute the stand-alone operation. At this point, the determination processing unit 173B stands by for only the first time period, thereby adjusting the intervals (predetermined intervals) at the time of repeating the operation shown in steps S101 to S109 in next operations. Although it is assumed that the first time period is approximately 10 to 20 seconds, it is not limited to this example.

In step S104, the determination processing unit 173B instructs to connect therebetween to the stand-alone relay 122. Accordingly, the stand-alone operation for supplying the power from the photovoltaic cell 20 to the load equipment 30 is executed.

In step S105, the determination processing unit 173B stands by for a second time period at the time of the stand-alone operation. Note that the determination processing unit 173B stands by for only the second time period, thereby obtaining a time period where the power supplied to the load equipment 30 is stabilized, i.e., a time period where the power consumed by the operation of the load equipment 30 is stabilized. Although it is assumed that the second time period is approximately 5 to 20 seconds, it is not limited to this example.

In step S106, the determination processing unit 173B determines whether or not the supplied power from the photovoltaic cell 20 satisfies the demanded power required for operating the load equipment, at the time of the stand-alone operation. Specifically, the determination processing unit 173B obtains the measured voltage value measured by the measuring unit 140, after a lapse of the second time period from a start of the stand-alone operation.

The determination processing unit 173B determines whether or not the measured voltage value measured by the measuring unit 140 is smaller than the adjusted voltage value adjusted by the constant voltage control of the DC/AC converter 111. For example, if the adjusted voltage value is 100V, the determination processing unit 173B determines whether or not the measured voltage value is smaller than 100V.

Moreover, if the measured voltage value is not smaller than 100V, the determination processing unit 173B determines that the supplied power satisfies the demanded power, and then repeats the operation of step S101. On the other hand, the determination processing unit 173B determines that the supplied power does not satisfy the demanded power, if the measured voltage value is smaller than 100V. Moreover, the determination processing unit 173B notifies the determined result to the supply control unit 173C.

In step S107, the supply control unit 173C suspends the stand-alone operation, if it is determined that the supplied power does not satisfy the demanded power.

Specifically, the supply control unit 173C instructs to the stand-alone relay 122 so as to disconnect therebetween, if a notice that the supplied power does not satisfy the demanded power is received from the determination processing unit 173B. Moreover, if the supply control unit 173C receives a notice that the supplied power satisfies the demanded power from the determination processing unit 173B, the supply control unit 173C performs particularly no operation, but continues the stand-alone operation.

In step S108, the supply control unit 173C increments by 1 the count number indicating the number of times of determining that the supplied power does not satisfy the demanded power. At this point, the count number is incremented every time the operation of steps S102 to S108 is repeated, without being reset in step S101. That is, the count number indicates the number of times of continuously determining that the supplied power does not satisfy the demanded power.

In step S109, the supply control unit 173C determines whether or not the incremented count number is equal to or greater than the predetermined threshold value (predetermined number of times). If the supply control unit 173C determines that the count number is smaller than the threshold value, the supply control unit 173C notifies the determined result to the determination processing unit 173B. The determination processing unit 173B which received this notice repeats the operation of step S102. That is, in step S107, after suspending the stand-alone operation, the determination processing unit 173B re-executes the stand-alone operation at the predetermined intervals to repeat the output determination process. However, the output determination process may be executed at random.

In step S110, if the supply control unit 173C determines that the incremented count number is equal to or greater than the threshold value, the supply control unit 173C notifies the determined result to the determination processing unit 173B. The determination processing unit 173B which received this notice stops the execution of the stand-alone operation. That is, the determination processing unit 173B stops re-executing of the stand-alone operation. In this manner, the determination processing unit 173B stops re-execution of the stand-alone operation, if the number of times of continuously determining that the supplied power does not satisfy the demanded power reaches the predetermined number of times.

As mentioned above, at the time of the stand-alone operation, the power conditioner 100 according to the present embodiment executes the output determination process for determining whether or not the supplied power from the photovoltaic cell 20 satisfies the demanded power required for operating the load equipment 30. In the output determination processing, the power conditioner 100 suspends the stand-alone operation, if it is determined that the supplied power does not satisfy the demanded power. Moreover, the power conditioner 100 re-executes the stand-alone operation to repeat the output determination process even after the stand-alone operation is suspended.

Moreover, the power conditioner 100 stops re-executing of the stand-alone operation, if the number of times of continuously determining that the supplied power does not satisfy the demanded power becomes equal to or greater than the threshold value (predetermined number of times) as a result of the repeat execution of the output determination process.

Thus, according to the power conditioner 100 based on the present embodiment, if the number of times of continuously determining that the supplied power does not satisfy the demanded power becomes equal to or greater than the threshold value, the power conditioner 100 stops re-executing of the stand-alone operation without endlessly repeating the stand-alone operation and the output determination process.

That is, according to the power conditioner 100 based on the present embodiment, at the time of the stand-alone operation, the power conditioner 100 can prevent from the stand-alone operation being continued to be executed, if the time period when the supplied power does not satisfy the demanded power becomes a long period of time, and a user leaves the load equipment in the state where the load equipment is turned ON.

As mentioned above, according to the power conditioner 100 based on the present embodiment, at the time of the stand-alone operation, it is possible to prevent an operation of the load equipment at an unintended timing.

Second Embodiment

Next, a second embodiment of the present invention will be described. Specifically, there will be described (1) a configuration of a power conditioner, and (2) an operation of the power conditioner.

(1) Configuration of Power Conditioner

A configuration of a power conditioner 100 according to the present embodiment will be described. At this point, in the power conditioner 100 according to the first embodiment mentioned above, the determination processing unit 173B is configured to stop re-executing of the stand-alone operation, if the number of times, i.e., the count number, of continuously determining that the supplied power does not satisfy the demanded power is equal to or greater than the threshold value.

In the power conditioner 100 according to the present embodiment, the determination processing unit 173B stops re-executing of the stand-alone operation, if a predetermined period elapses without determining that the supplied power satisfies the demanded power, since it is determined that the supplied power does not satisfy the demanded power after suspending the stand-alone operation.

Specifically, in the power conditioner 100 according to the present embodiment, if the determination processing unit 173B determines that the supplied power does not satisfy the demanded power at the time of the stand-alone operation, the determination processing unit 173B notifies the determined result to the supply control unit 173C.

Moreover, if the supply control unit 173C receives a notice that the supplied power does not satisfy the demanded power as the determined result, the supply control unit 173C instructs to disconnect therebetween to the stand-alone relay 122 to suspend the stand-alone operation. At this time, the supply control unit 173C drives a timer. Then, the supply control unit 173C determines whether or not a timer value is equal to or greater than a predetermined threshold value (predetermined period). If the supply control unit 173C determines that the timer value is smaller than the threshold value, the supply control unit 173C notifies the determined result to the determination processing unit 173B.

The determination processing unit 173B which received this notice executes the stand-alone operation at predetermined intervals to repeat the output determination process. That is, after suspending the stand-alone operation, the determination processing unit 173B re-executes the stand-alone operation at predetermined intervals, and then determines whether or not the supplied power satisfies the demanded power.

On the other hand, if the supply control unit 173C determines that the timer value is equal to or greater than the threshold value, the supply control unit 173C notifies the determined result to the determination processing unit 173B. The determination processing unit 173B which received this notice stops re-execution of the stand-alone operation. The determination processing unit 173B also stops the execution of the output determination process.

Note that the timer value is reset and the timer is stopped if the determination processing unit 173B determines that the supplied power satisfies the demanded power. In this manner, the determination processing unit 173B stops re-executing of the stand-alone operation, if a predetermined period (threshold value) elapses without determining that the supplied power satisfies the demanded power after it is determined that the supplied power does not satisfy the demanded power.

(2) Operation of Power Conditioner

Figure 4:
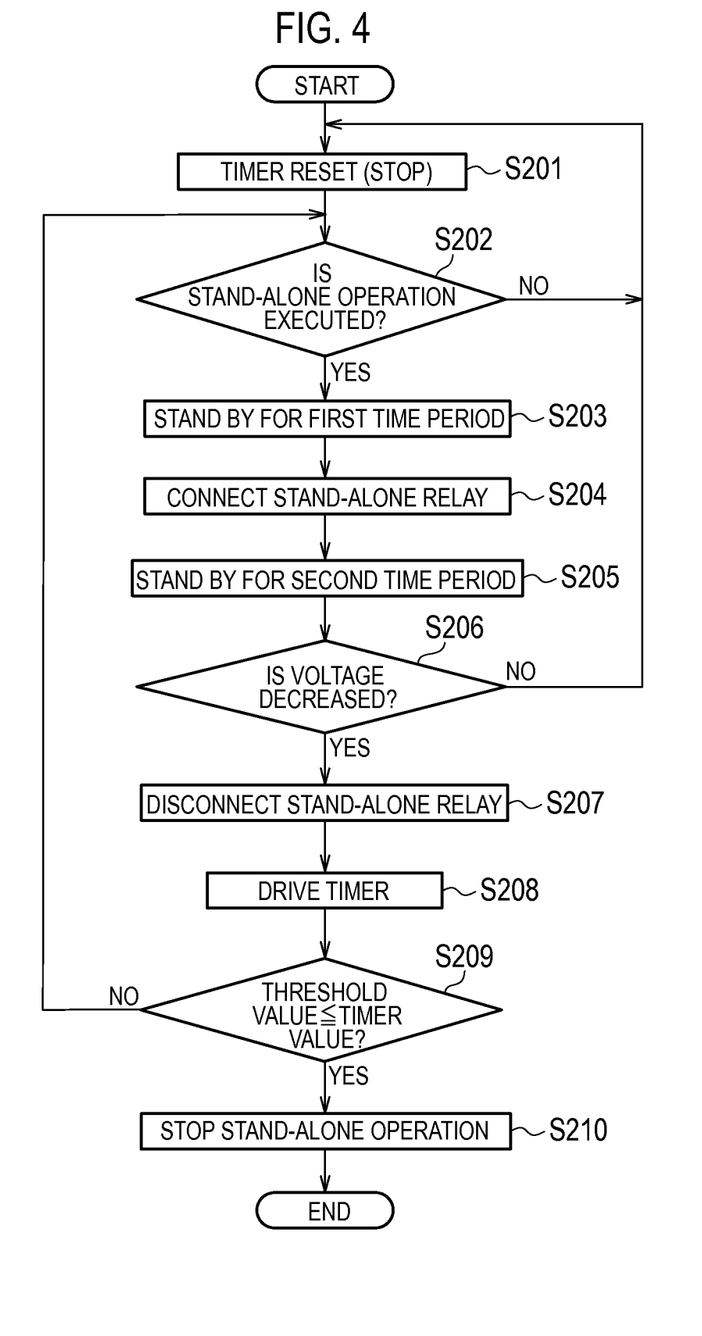
FIG. 4 is a sequence diagram showing an operation of a power conditioner according to a second embodiment of the present invention.

Next, an operation of the power conditioner 100 according to the present embodiment will be described with reference to FIG. 4. FIG. 4 is a sequence diagram showing an operation of the power conditioner 100 according to the present embodiment.

First, in step S201, before starting the stand-alone operation, the supply control unit 173C resets a timer value, and stops the timer in the power conditioner 100.

In this case, since the operation of steps S202 to S207 is the same as the operation in the first embodiment mentioned above, the description thereof is omitted.

In step S208, the supply control unit 173C drives the timer, if the determination processing unit 173B determines that the supplied power does not satisfy the demanded power. Note that if the timer has already been driven, the timer is continued to be activated. In this case, the timer value is incremented as repeating the operation of steps S102 to S108, without resetting and stopping the timer in step S101. That is, the timer value indicates a time period which elapses without determining that the supplied power satisfies the demanded power, after determining that the supplied power does not satisfy the demanded power.

In step S209, the supply control unit 173C determines whether or not the timer value is equal to or greater than the predetermined threshold value. If the supply control unit 173C determines that the timer value is smaller than the threshold value, the supply control unit 173C notifies the determined result to the determination processing unit 173B. The determination processing unit 173B which received this notice repeats the operation of step S202. That is, after suspending the stand-alone operation in step S207, the determination processing unit 173B re-executes the stand-alone operation at the predetermined intervals, and then determines whether or not the supplied power satisfies the demanded power.

In step S210, if the supply control unit 173C determines that the timer value is equal to or greater than the threshold value, the supply control unit 173C notifies the determined result to the determination processing unit 173B. The determination processing unit 173B which received this notice stops re-execution of the stand-alone operation. Note that the determination processing unit 173B also stops the output determination process. In this manner, the determination processing unit 173B stops re-executing of the stand-alone operation, if a predetermined period (threshold value) elapses without determining that the supplied power satisfies the demanded power after it is determined that the supplied power does not satisfy the demanded power.

As mentioned above, at the time of the stand-alone operation, the power conditioner 100 according to the present embodiment repeatedly executes the output determination process for determining whether or not the supplied power from the photovoltaic cell 20 satisfies the demanded power required for operating the load equipment 30. In the output determination process, the power conditioner 100 stops re-executing of the stand-alone operation, if a predetermined period (threshold value) elapses without determining that the supplied power satisfies the demanded power after it is determined that the supplied power does not satisfy the demanded power.

Thus, according to the power conditioner 100 based on the present embodiment, if the predetermined period elapses without the supplied power satisfying the demanded power, the power conditioner 100 stops re-executing of the stand-alone operation without endlessly repeating the stand-alone operation and the output determination process.

That is, according to the power conditioner 100 based on the present embodiment, the power conditioner 100 can prevent from the stand-alone operation being continued to be executed, if the time period when the supplied power does not satisfy the demanded power becomes a long period of time, and a user leaves the load equipment in the state where the load equipment is turned ON.

As mentioned above, according to the power conditioner 100 based on the present embodiment, at the time of the stand-alone operation, it is possible to prevent an operation of the load equipment at the unintended timing.

Third Embodiment

Next, a third embodiment of the present invention will be described with reference to FIG. 5. In a power control system 1 according to the present embodiment, a point of including a power management device 200 are the principal point of difference with the power control system 1 according to the first to second embodiments mentioned above. Note that it is assumed that the power management device 200 is a device called Home Energy Management System (HEMS) in smart grid technology.

Figure 5:
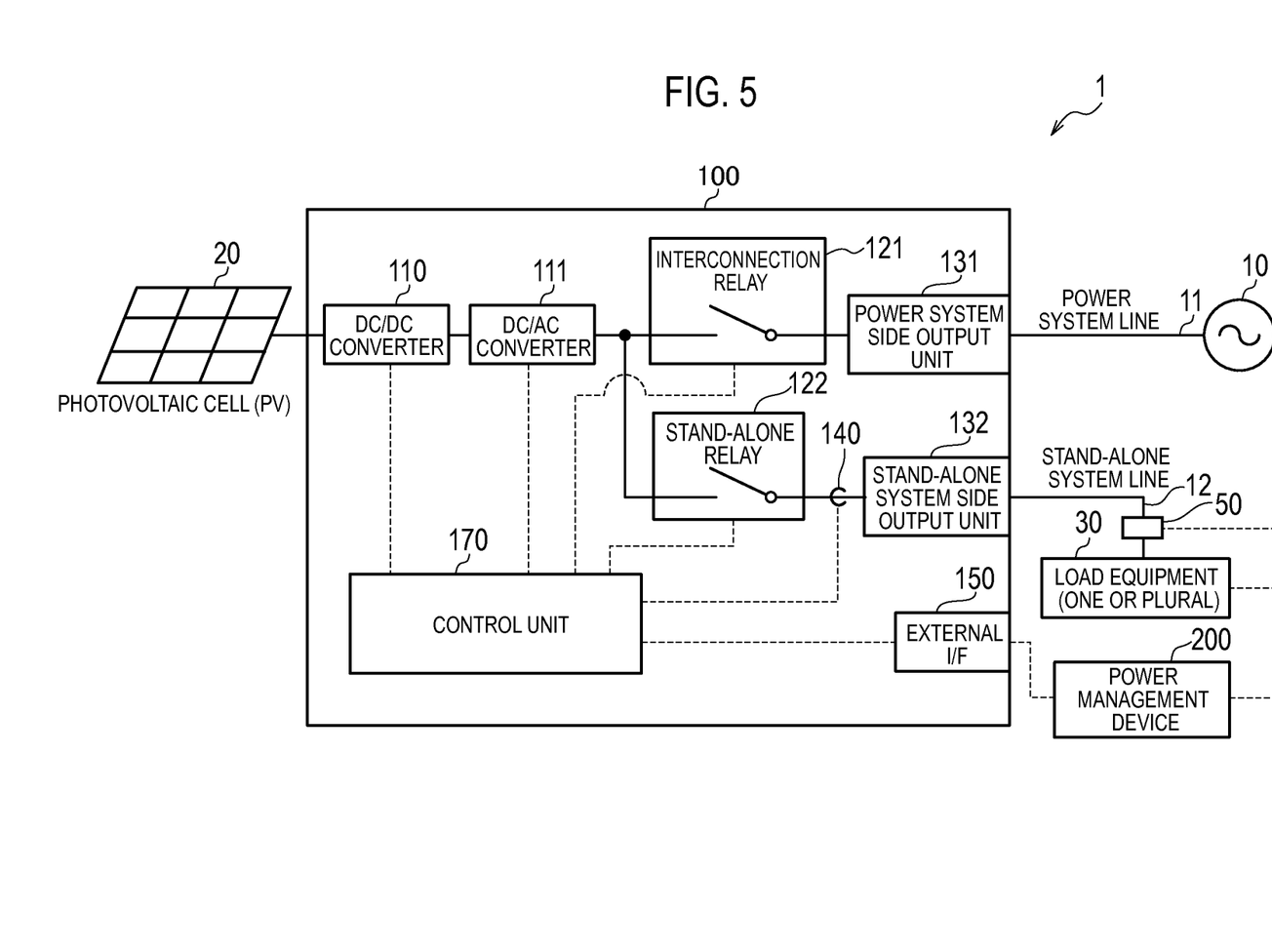
FIG. 5 is a schematic structure diagram showing a configuration of a power control system according to a third embodiment of the present invention.

Specifically, as shown in FIG. 5, the power conditioner 100 communicates with the power management device 200. The power management device 200 is connected to a load equipment 30, and an electric socket 50 for supplying power to the load equipment 30. The load equipment 30 can control to start, stop, etc., an operation in response to instructions from the power management device 200. The electric socket 50 can connect or disconnect between a stand-alone system line 12 and the load equipment 30 in response to the instructions from the power management device 200.

Moreover, the power management device 200 stores type information indicating a type of load equipment 30 (electric heaters, televisions, radios, etc.) provided at the consumer site, and a demanded power required for operating the load equipment 30.

Moreover, in the power conditioner 100, the determination processing unit 173B obtains the type information on the load equipment 30 from the power management device 200, if the supply control unit 173C determines that the count number is equal to or greater than the threshold value, or determines that the timer value is equal to or greater than the threshold value. Moreover, the determination processing unit 173B determines whether or not the load equipment 30 is a specific device on the basis of the type information, when obtaining the type information on the load equipment 30. In this case, the specific device is a load equipment which may have a harmful effect, e.g., an accident, at the time of user's absence, and electric heaters, televisions, radios, etc., are listed as an example.

Specifically, if the load equipments 30 are electric heaters, televisions, radios, etc., the determination processing unit 173B determines that the load equipment 30 is the specific device, and then stops re-executing of the stand-alone operation. That is, the determination processing unit 173B executes the operation shown in the first to second embodiments mentioned above, and then stops re-executing of the stand-alone operation.

On the other hand, if the load equipments 30 are devices other than specific device, e.g., refrigeration devices, personal computers, the determination processing unit 173B determines that the load equipments 30 are not specific device, and then re-executes the operation of FIGS. 3 to 4. That is, the determination processing unit 173B re-executes the stand-alone operation.

Note that the determination processing unit 173B may stop re-executing of the stand-alone operation in consideration of safety, if the specific device and a device other than the specific device are coexisted as the load equipments 30. Moreover, if the specific device and a device other than the specific device are coexisted as the load equipments 30, the determination processing unit 173B may instruct to the power management device 200 to stop only operation of the specific device, and then may re-execute the stand-alone operation. At this time, the power management device 200 may instruct to the load equipment 30 which is the specific device to stop the operation, and may instruct to disconnection therebetween to the electric socket 50 connected to the load equipment 30 which is the specific device.

As mentioned above, according to the power conditioner 100 based on the present embodiment, if it is determined that the count number is equal to or greater than the threshold value, or if it is determined that the timer value is equal to or greater than the threshold value, the stand-alone operation is stopped after determining whether or not the load equipment 30 is the specific device, without immediately stopping re-executing of the stand-alone operation.

Moreover, the power conditioner 100 re-executes the stand-alone operation, if the load equipment 30 is not the specific device. Accordingly, according to the power conditioner 100 based on the present embodiment, at the time of a stand-alone operation, it is possible to prevent an operation of the load equipment at the unintended timing, and it is possible to operate the load equipment 30 while executing the stand-alone operation as much as possible.

Other Embodiments

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

For example, in the embodiments mentioned above, although the photovoltaic cell 20 listed as an example has been described as distributed power supply, the present invention can be similarly applied to a case of using another electronic supplied power to which power output is changed, e.g., a wind power generator.

In the embodiments mentioned above, although the adjusted voltage value has been described as the voltage value adjusted by the constant voltage control, the adjusted voltage value may be a voltage value arbitrarily set up.

Moreover, in the embodiments mentioned above, the functions of the control unit 170 in the power conditioner 100 may be provided in the power management device 200, or may be provided in various systems in the smart grid technology, e.g., Building Energy Management System (BEMS) etc.

Moreover, it is also possible to combine the embodiments with the modified examples mentioned above. Thus, it should be understood that the present invention includes various embodiments, etc., that are not described herein. Therefore, the present invention is limited only by the specific features of the invention in the scope of the claims reasonably evident from the disclosure above.

Note that the entire contents of Japanese Patent Application No. 2011-116279 (filed on May 24, 2011) are incorporated herein by reference.

[Additional Remark]

In the embodiments, if it is determined continuously for the predetermined number of times that the supplied power does not satisfy the demanded power, or if the predetermined period elapses without determining that the supplied power satisfies the demanded power after determining that the supplied power does not satisfy the demanded power, re-executing of the stand-alone operation is stopped.

In this case, it should be noted that if re-executing of the stand-alone operation is not stopped, then there is a problem as follows.

Specifically, if the weather does not serve over a long term, sufficient power may be no longer supplied to the load equipment over a long period of time from the distributed power supply. In such a case, since the load equipment cannot execute the correct operation at the time of the stand-alone operation, if the load equipment is an electric heater etc., for example, the electric heater cannot sufficiently generate heat. Moreover, if the load equipment is radio etc., sounds may not come out therefrom.

If such a situation continues, the user not only cannot understand whether or not the stand-alone operation is executed, but also may leave the load equipment in the state where the load equipment is turned ON, forgetting that the stand-alone operation is executed.

However, since the power control apparatus continues to execute the output determination process at the predetermined intervals also in such a situation, if the weather serves and the supplied power from the distributed power supply comes to satisfy the demanded power for the load equipment, the load equipment will start the correct operation.

Consequently, if the load equipment is an electric heater etc., it may generate heat at the time of absence of user. If the load equipment is television or radio, sounds may come out therefrom in a situation to which a user does not view and listen, and thereby it may generate noise in the neighborhood. That is, in the power control apparatus mentioned above, the load equipment may be operated at the unintended timing at the time of the stand-alone operation.

INDUSTRIAL APPLICABILITY

According to the present invention, at the time of the stand-alone operation, the power control apparatus and the power control method is provided which can prevent from the operation by the load equipment at the unintended timing.

The invention claimed is:

1. A power control apparatus, provided at a consumer site having a distributed power supply capable of supplying power and a load equipment, controlling a stand-alone operation in which power supplied from the distributed power supply is converted into AC power and the converted AC power is supplied to the load equipment, the power control apparatus comprising:
a determination processing unit that determines whether or not a supplied power from the distributed power supply satisfies a demanded power required for operating the load equipment, when it operates in the stand-alone operation; and
a supply control unit that suspends the stand-alone operation if it is determined that the supplied power does not satisfy the demanded power, wherein
the determination processing unit
re-executes the stand-alone operation after suspending the stand-alone operation, and determines whether or not the supplied power satisfies the demanded power, and
stops the re-executing of the stand-alone operation if it is determined continuously for a predetermined number of times that the supplied power does not satisfy the demanded power, or if a predetermined period elapses without determining that the supplied power satisfies the demanded power after determining that the supplied power does not satisfy the demanded power.

2. The power control apparatus according to claim 1, wherein
the determination processing unit executes the re-executing process and the determining process at predetermined intervals, after suspending the stand-alone operation.

3. The power control apparatus according to claim 1, wherein
the determination processing unit starts supplying an output from the distributed power supply to the load equipment after the re-executing process, and executes the determining process after starting to supply the power.

4. The power control apparatus according to claim 3, wherein
the determination processing unit starts power supply from the distributed power supply to the load equipment, after a first time period elapses from the re-executing process.

5. The power control apparatus according to claim 3, wherein
the determination processing unit executes the determining process after a second time period elapses from a start of the power supply from the distributed power supply to the load equipment is started.

6. The power control apparatus according to claim 1, wherein
the determination processing unit does not stop the re-executing process if the load equipment is not a specific device, even if it is determined continuously for the predetermined number of times that the supplied power does not satisfy the demanded power, or even if the predetermined period elapses after determining that the supplied power does not satisfy the demanded power without determining that the supplied power satisfies the demanded power.

7. The power control apparatus according to claim 6, comprising:
an interface that communicates with a power management device that manages power of the load equipment, and that obtains type information on whether or not the load equipment is the specific device.

8. The power control apparatus according to claim 7, wherein
the specific device is a space heater or a voice output device.

9. The power control apparatus according to claim 1, comprising:
an interface that communicates with a power management device that manages power of the load equipment, wherein
the determination processing unit instructs the power management device to stop the operation via the interface when the load equipment corresponding to a specific device exists, if it is determined continuously for a predetermined number of times that the supplied power does not satisfy the demanded power, or if a predetermined period elapses after determining that the supplied power does not satisfy the demanded power without determining that the supplied power satisfies the demanded power.

10. The power control apparatus according to claim 9, wherein
the specific device is a space heater or a voice output device.

11. A power control method in a power control apparatus provided at a consumer site having a distributed power supply capable of supplying power and a load equipment, the power control apparatus that controls a stand-alone operation in which power supplied from the distributed power supply is converted into AC power and the converted AC power is supplied to the load equipment, the power control method comprising:
a step of determining whether or not a supplied power from the distributed power supply satisfies a demanded power required for operating a load equipment, at the time of the stand-alone operation;
a step of suspending the stand-alone operation if it is determined that the supplied power not satisfying the demanded power;
a step of re-executing the stand-alone operation after suspending the stand-alone operation, and determining whether or not the supplied power satisfies the demanded power; and
a step of stopping the re-executing of the stand-alone operation if it is determined continuously for a predetermined number of times that the supplied power does not satisfy the demanded power, or if a predetermined period elapses without determining that the supplied power satisfies the demanded power after determining that the supplied power does not satisfy the demanded power.

* * * * *